US012205507B2

(12) United States Patent
Wang et al.

(10) Patent No.: US 12,205,507 B2
(45) Date of Patent: Jan. 21, 2025

(54) DISPLAY PANEL DRIVING METHOD, DISPLAY PANEL, AND DISPLAY APPARATUS

(71) Applicants: Wuhan BOE Optoelectronics Technology Co.,Ltd., Hubei (CN); BOE Technology Group Co., Ltd., Beijing (CN)

(72) Inventors: Hui Wang, Beijing (CN); Rongcheng Liu, Beijing (CN)

(73) Assignees: Wuhan BOE Optoelectronics Technology Co.,Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/271,840

(22) PCT Filed: Jul. 1, 2022

(86) PCT No.: PCT/CN2022/103254
§ 371 (c)(1),
(2) Date: Jul. 11, 2023

(87) PCT Pub. No.: WO2023/005596
PCT Pub. Date: Feb. 2, 2023

(65) Prior Publication Data

US 2024/0071272 A1 Feb. 29, 2024

(30) Foreign Application Priority Data

Jul. 30, 2021 (CN) ......................... 202110871022.5

(51) Int. Cl.
*G09G 3/20* (2006.01)

(52) U.S. Cl.
CPC ....... *G09G 3/20* (2013.01); *G09G 2300/0426* (2013.01); *G09G 2300/0842* (2013.01);
(Continued)

(58) Field of Classification Search
CPC ............. G09G 3/20; G09G 2300/0426; G09G 2300/0842; G09G 2310/0286;
(Continued)

(56) References Cited

U.S. PATENT DOCUMENTS

| | | | | |
|---|---|---|---|---|
| 2017/0169754 | A1 | 6/2017 | Wang et al. | |
| 2018/0197453 | A1 * | 7/2018 | Lee ......................... | G09G 3/32 |

(Continued)

FOREIGN PATENT DOCUMENTS

| | | | |
|---|---|---|---|
| CN | 103390394 | A | 11/2013 |
| CN | 104867474 | A | 8/2015 |

(Continued)

OTHER PUBLICATIONS

International Search Report for PCT/CN2022/103254 Mailed Sep. 6, 2022.

*Primary Examiner* — Md Saiful A Siddiqui
(74) *Attorney, Agent, or Firm* — Ling Wu; Stephen Yang; Ling and Yang Intellectual Property

(57) ABSTRACT

A display panel driving method, a display panel and a display apparatus. The display panel driving method comprises: according to a data signal transmitted in a data line, determining whether a grayscale value difference of a data signal input by a pixel unit of an nth row and a data signal input by a pixel unit of an (n−1)th row is greater than a threshold, n being a positive integer less than or equal to N; if the grayscale value difference between the data signal input by the pixel unit of the nth row and the data signal input by the pixel unit of the (n−1)th row is greater than the threshold, then adjusting the phase of a clock signal input by the nth shift register, such that the falling of the pull-up node of the nth shift register is delayed along with time, to output a phase-delayed scan signal.

20 Claims, 9 Drawing Sheets

(52) U.S. Cl.
CPC ............... *G09G 2310/0286* (2013.01); *G09G 2310/061* (2013.01); *G09G 2310/08* (2013.01); *G09G 2320/0209* (2013.01)

(58) Field of Classification Search
CPC ......... G09G 2310/061; G09G 2310/08; G09G 2320/0209; G09G 2320/0223
See application file for complete search history.

(56) References Cited

U.S. PATENT DOCUMENTS

| | | | | |
|---|---|---|---|---|
| 2019/0027085 | A1* | 1/2019 | Zeng | G09G 3/20 |
| 2019/0066623 | A1* | 2/2019 | Zhao | G09G 3/3677 |
| 2020/0051492 | A1* | 2/2020 | Chen | G09G 3/20 |
| 2020/0365090 | A1 | 11/2020 | Yoon et al. | |
| 2021/0166608 | A1 | 6/2021 | Guo et al. | |
| 2022/0036841 | A1* | 2/2022 | Guo | G09G 3/3674 |
| 2022/0122506 | A1 | 4/2022 | Gao | |

FOREIGN PATENT DOCUMENTS

| | | | |
|---|---|---|---|
| CN | 107068086 | A | 8/2017 |
| CN | 107507585 | A | 12/2017 |
| CN | 111508448 | A | 8/2020 |
| CN | 111554242 | A | 8/2020 |
| CN | 111883084 | A | 11/2020 |
| CN | 113763857 | A | 12/2021 |

* cited by examiner

DISPLAY PANEL DRIVING METHOD, DISPLAY PANEL, AND DISPLAY APPARATUS

CROSS-REFERENCE TO RELATED APPLICATIONS

The present application is a U.S. National Phase Entry of International PCT Application No. PCT/CN2022/103254 having an international filing date of Jul. 1, 2022, which claims priority to Chinese patent application No. 202110871022.5, filed on Jul. 30, 2021. The above-identified applications are incorporated herein by reference in their entireties.

TECHNICAL FIELD

The present disclosure belongs to the technical field of display, specifically to a method for driving a display panel, a display panel, and a display apparatus.

BACKGROUND

With a continuous development of display technologies, in recent years, a development of display gradually presents a development trend of a high integration level and a low cost. One of the most important technologies is an implementation of a mass production of a Gate Driver on Array (GOA) technology. A gate switch circuit composed of Thin Film Transistors (TFTs) is integrated on an array substrate of a display panel by using the GOA technology to form scanning drive for the display panel, so that a gate drive integrated circuit part can be omitted, which can not only reduce a product cost from both aspects of a material cost and a manufacturing process, but also achieve an aesthetic design of two symmetrical sides and a narrow bezel of the display panel.

A current development direction of large-size display products, such as TV, is a high resolution and a high refresh rate. At present, high-end TV products have developed to 8K 120 Hz or even 8K 240 Hz. However, in a display process of the large-size display products, especially when data signals are switched between high and low gray scales, poor display such as horizontal crosstalk, line image sticking, or the like occurs easily, which affects severely a quality of the large-size display products and reduces a yield of the large-size display products.

SUMMARY

The present disclosure aims at solving at least one of technical problems existing in the prior art, and provides a method for driving a display panel, a display panel, and a display apparatus.

In a first aspect, an embodiment of the present disclosure provides a method for driving a display panel, wherein the display panel includes: N gate lines and M data lines intersected, and pixel units located within regions limited by the gate lines and the data lines; the display panel also includes N shift registers and P clock signal lines; every adjacent P shift registers in the N shift registers are respectively connected to the P clock signal lines; signal output ends of the N shift registers are respectively connected one-to-one with the N gate lines; wherein P is an even number greater than or equal to 2; N is an integer greater than or equal to P; M is a positive integer; and the method for driving the display panel includes: determining, according to data signals transmitted in the data lines, whether a difference between gray scale values of data signals inputted by an n-th row of pixel units and an (n−1)-th row of pixel units is greater than a threshold value; n is a positive integer less than or equal to N; if the difference between the gray scale values of the data signals inputted by the n-th row of pixel units and the (n−1)-th row of pixel units is greater than the threshold value, adjusting a phase of a clock signal inputted by an n-th shift register, so that a falling edge of a pull-up node of the n-th shift register is delayed to output a scanning signal with a delayed phase.

Optionally, if the difference between the gray scale values of the data signals inputted by the n-th row of pixel units and the (n−1)-th row of pixel units is greater than the threshold value, an interval between a time point of a data signal inputted by the n-th row of pixel units and a time point of a falling edge of the pull-up node of the n-th shift register is greater than 1H; wherein 1H is a charging time of a row of pixel units.

Optionally, adjusting a phase of a clock signal inputted by an n-th shift register includes: extending a non-working level maintenance time of the clock signal inputted by the n-th shift register.

Optionally, the non-working level maintenance time of the clock signal inputted by the n-th shift register is longer than a non-working level maintenance time of a preset clock signal by 1H to 2H.

Optionally, the non-working level maintenance time of the clock signal inputted by the n-th shift register is equal to a pre-charging maintenance time of the pull-up node.

Optionally, adjusting a phase of a clock signal inputted by an n-th shift register includes: extending a working level maintenance time of the clock signal inputted by the n-th shift register.

Optionally, the working level maintenance time of the clock signal inputted by the n-th shift register is longer than a working level maintenance time of a preset clock signal by 1H to 2H.

Optionally, the working level maintenance time of the clock signal inputted by the n-th shift register is equal to a charging time of the pull-up node.

Optionally, a time of a data signal inputted by the n-th row of pixel units is overlapped with the charging time of the pull-up node, and an overlapping time is greater than or equal to 2H.

Optionally, the method for driving the display panel also includes: determining, according to data signals transmitted in the data lines, whether a difference between gray scale values of data signals inputted by an (n+m)-th row of pixel units and an (n+m−1)-th row of pixel units is greater than a threshold value; where (n+m) is a positive integer less than or equal to N; if the difference between the gray scale values of the data signals inputted by the (n+m)-th row of pixel units and the (n+m−1)-th row of pixel units is less than or equal to the threshold value, inputting a clock signal of an initial phase to an (n+m)-th shift register.

In a second aspect, an embodiment of the present disclosure provides a display panel, including a detection module, wherein the detection module is configured to detect whether a difference between gray scale values of data signals inputted by an n-th row of pixel units and an (n−1)-th row of pixel units is greater than a threshold value; if the difference between the gray scale values of the data signals inputted by the n-th row of pixel units and the (n−1)-th row of pixel units is greater than the threshold value, adjust a phase of a clock signal inputted by an n-th shift register, so that a falling edge of a pull-up node of the n-th shift register is delayed to output a scanning signal with a delayed phase.

Optionally, each of the N shift registers includes: an input sub-circuit, an output sub-circuit, and a pull-up reset sub-circuit; wherein, the input sub-circuit is configured to, in response to an input signal from a signal input end, write the input signal to a pull-up node; the output sub-circuit is configured to, in response to a potential of the pull-up node, output a clock signal inputted from a clock signal end through a signal output end; and the pull-up reset sub-circuit is configured to, in response to a pull-up reset signal inputted from a pull-up reset signal end, reset the potential of the pull-up node by a non-working level signal.

Optionally, a signal output end of an i-th shift register is connected to a signal input end of an (i+p)-th shift register; wherein, $P/2 \le p < N$; and $i \le N-p$; and a pull-up reset signal end of an j-th shift register is connected to a signal output end of an (j+q)-th shift register; $2 \le q-p < N/2$; and $j \le N-q$.

Optionally, the display panel also includes: a first frame opening signal line and a second frame opening signal line; wherein, signal input ends of odd rows in a first shift register to an (N/2)-th shift register are all connected to the first frame opening signal line; and signal input ends of even rows in the first shift register to the (N/2)-th shift register are all connected to the second frame opening signal line.

In a third aspect, an embodiment of the present disclosure provides a display apparatus, including the display panel provided as described above.

DETAILED DESCRIPTION

To enable those skilled in the art to better understand technical solutions of the present disclosure, the present disclosure is described in further detail below in conjunction with the accompanying drawings and specific implementations.

Unless otherwise defined, technical terms or scientific terms used in the present disclosure should have the meanings as commonly understood by those of ordinary skill in the art that the present disclosure belongs to. The "first", "second" and similar terms used in the present disclosure do not indicate any order, quantity, or importance, but are used only for distinguishing different components. Similarly, similar words such as "a", "an" or "the" do not denote a limitation on quantity, but rather denote the presence of at least one. "Include", "contain", or similar words mean that elements or objects appearing before the words cover elements or objects listed after the words and their equivalents, but do not exclude other elements or objects. "Connect", "connected", or a similar term is not limited to a physical or mechanical connection, but may include an electrical connection, whether direct or indirect. "Upper", "lower", "left", "right", etc., are used to represent relative position relations, and when an absolute position of a described object is changed, the relative position relation may also be correspondingly changed.

Figure 1:
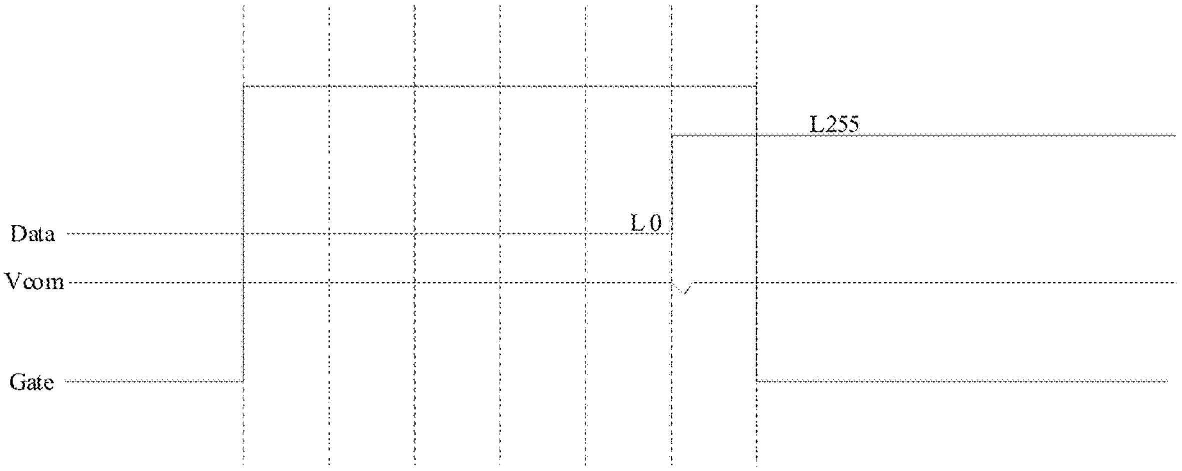
FIG. 1 is a timing diagram of a scanning signal, a data signal, and a common electrode signal of an exemplary display panel.

FIG. 1 is a timing diagram of a scanning signal and a data signal of an exemplary display panel. As shown in FIG. 1, when a data signal Data is switched between high and low gray scales, for example, the data signal Data is switched from L63 to L0, or from L127 to L255, or from L0 to L255, etc., at this point, the switching of the data signal Data easily causes a common electrode signal Vcom in the display panel to be pulled due to capacitive coupling, thus causing the common electrode signal Vcom to fluctuate. When a scanning signal Gate is turned off, the common electrode signal Vcom is not restored to an original state, resulting in poor display such as crosstalk in a horizontal direction caused by a difference between a common electrode signal Vcom corresponding to the row of pixel units and a common electrode signal Vcom at another position. On the other hand, when the data signal Data changes, the row of pixel units have no pre-charging or reverse pre-charging, so that a charging rate of the row of the pixel units is relatively low, and poor display such as line image sticking is easy to occur.

In order to solve at least one of the above-mentioned technical problems, embodiments of the present disclosure provide a method for driving a display panel, a display panel, and a display apparatus, and the method for driving the display panel, the display panel, and the display apparatus according to the embodiments of the present disclosure will be further described in detail with reference to the accompanying drawings and specific implements.

It should be noted here that a transistor used in embodiments of the present disclosure may be a thin film transistor, a field effect transistor, or a same device with other characteristics. Since a source and a drain of the transistor used are symmetrical, there is no difference between the source and the drain of the transistor. In an embodiment of the present disclosure, in order to distinguish the source and the drain of the transistor, one of the two electrodes is referred to as a first electrode, and the other is referred to as a second electrode, a gate is referred to as a control electrode. In addition, the transistor may be divided into N-type and P-type according to characteristics of the transistor. In the following embodiments, illustration is made with respect to an N-type transistor. When the N-type transistor is adopted, the first electrode is a source of the N-type transistor, and the second electrode is a drain of the N-type transistor. When a high level is inputted to the gate, the source and the drain are turned on, while the P-type transistor is reversed. It is conceivable that an implementation by using a P-type transistor can be easily conceived by those skilled in the art without creative effort and therefore this is within the protection scope of the embodiments of the present disclosure.

Among them, since the transistor adopted in the embodiments of the present disclosure is the N-type transistor, a working level signal in the embodiments of the present disclosure refers to a high-level signal, and the non-working level signal is a low-level signal; a corresponding working level end is a high-level signal end, and a non-working level end is a low-level signal end.

Usually, a display panel includes multiple gate lines and multiple data lines, wherein the gate lines and the data lines are intersected to define multiple pixel regions, and each pixel region is provided with a pixel unit. Among them, a structure of the display panel is described by taking an extending direction of various gate lines as a row direction and an extending direction of various data lines as a column direction as an example. When the display panel is driven to display, scanning signals may be written to the gate lines row by row according to a picture to be displayed, while data signals may be written to the various data lines, so that pixel units in the display panel are lit row by row.

Among them, an electrode driving signal is provided by a gate driving circuit, and a data signal is provided by a source driving circuit; in a related technology, the gate driving circuit may be integrated in a gate driving chip, and the source driving circuit may be integrated in a source driving chip; while at present, for a less quantity of chips, and to achieve a narrow bezel or no bezel, a technology of integrating the gate driving circuit on an array substrate (Gate On Array; GOA) is provided; wherein, the gate driving circuit includes multiple cascaded shift registers integrated on the array substrate, and each shift register is connected with a gate line one-to-one, and is configured to provide a scanning signal for a gate line connected with it.

In order to more clearly understand how the shift register outputs the scanning signal, illustration is made in the following in combination with a specific example of the shift register.

Figure 2:
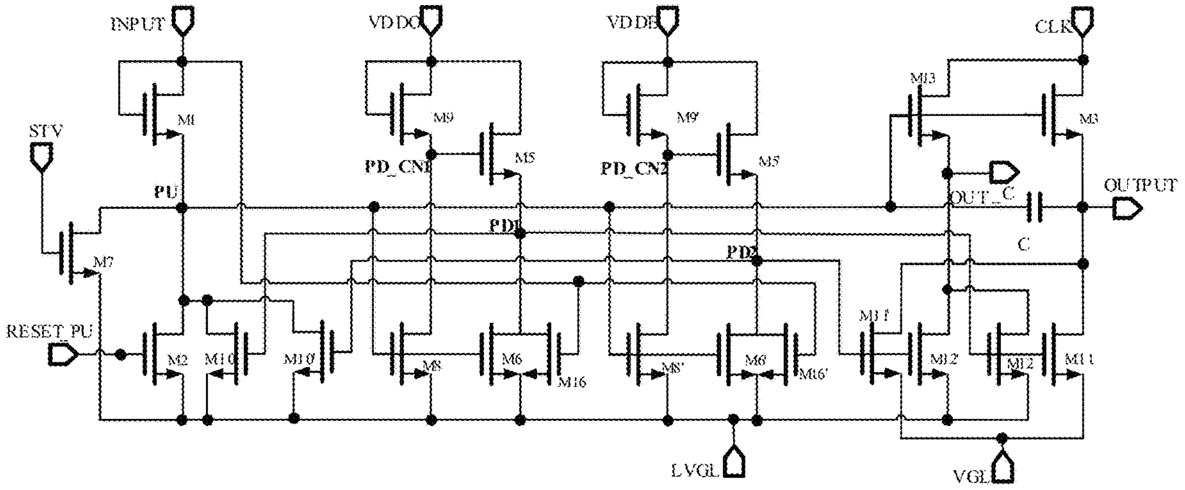
FIG. 2 is a schematic diagram of a structure of a shift register according to an embodiment of the present disclosure.

FIG. 2 is a schematic diagram of a structure of a shift register according to an embodiment of the present disclosure. As shown in FIG. 2, the shift register includes an input sub-circuit, an output sub-circuit, and a pull-up reset sub-circuit; wherein the input sub-circuit is configured to, in response to an input signal inputted by a signal input end INPUT, write the input signal into a pull-up node PU to charge the pull-up node PU; the output sub-circuit is configured to, in response to a potential of the pull-up node PU, output a clock signal inputted from a clock signal end CLK through a signal output end OUTPUT; the pull-up reset sub-circuit is configured to, in response to a pull-up reset signal outputted from a pull-up reset signal end RESET_PU, reset the potential of the pull-up node PU by a low-level signal.

Specifically, as shown in FIG. 2, the input sub-circuit includes a first transistor M1; the pull-up reset sub-circuit includes a second transistor M2; the output sub-circuit includes a third transistor M3 and a storage capacitor C; wherein a gate and a source of the first transistor M1 are connected to the signal input end INPUT, and a drain of the first transistor M1 is connected to the pull-up node PU; a gate of the second transistor M2 is connected to a pull-up reset signal end RESET_PU, a source of the second transistor M2 is connected to the pull-up node PU, and a drain of the second transistor M2 is connected to a low-level signal end VGL; a gate of the third transistor M3 is connected to the pull-up node PU, a source of the third transistor M3 is connected to the clock signal end CLK, and a drain of the third transistor M3 is connected to a signal output end OUTPUT; a first end of the storage capacitor C is connected to the pull-up node PU, and a second end of the storage capacitor C is connected to the signal output end OUTPUT.

It should be noted here that after the pull-up node PU is reset in a reset stage, the pull-up node PU is at a low level, at this time, the third transistor M3 is turned off, and the signal output end OUTPUT no longer outputs, so as to complete resetting of the signal output end OUTPUT.

As shown in FIG. 2, the shift register according to an embodiment of the present disclosure also includes: a first pull-down control sub-circuit, a second pull-down control sub-circuit, a first pull-down sub-circuit, a second pull-down sub-circuit, a first noise reduction sub-circuit, a second noise reduction sub-circuit, a discharging sub-circuit, a first auxiliary sub-circuit, a second auxiliary sub-circuit, and a cascade sub-circuit. Among them, the discharging sub-circuit discharges the pull-up node PU through a low level inputted from the low-level signal end VGL in response to a frame opening signal inputted from a frame opening signal end STV; the first pull-down control sub-circuit and the second pull-down control sub-circuit have the same structure and function, while they only work in a time-sharing mode. Similarly, the first pull-down sub-circuit and the second pull-down sub-circuit have the same structure and function; the first auxiliary sub-circuit and the second auxiliary sub-circuit have the same structure and function; and the first noise reduction sub-circuit and the second noise reduction sub-circuit have the same structure and function. The input sub-circuit, the output sub-circuit, and the pull-up reset sub-circuit have the same structure and function as the above, so they will not be repeated here.

The first auxiliary sub-circuit and the second auxiliary sub-circuit are each configured to, in response to an input signal inputted by the signal input end INPUT, pull down a potential of a first pull-down node PD1 and a potential of a second pull-down node PD2 by a low-level signal, respectively; the first pull-down control sub-circuit is configured to control the potential of the first pull-down node PD1 in response to a first power supply voltage inputted from a first power supply voltage signal end VDDO; the second pull-down control sub-circuit is configured to control the potential of the second pull-down node PD2 in response to a second power supply voltage inputted from a second power supply voltage signal end VDDE; the first pull-down sub-circuit is configured to, in response to the potential of the pull-up node PU, pull down the potential of the first pull-down node PD1 and a potential of a first pull-down control node PD_CN1 through a low-level signal inputted from the low-level signal end VGL; the second pull-down sub-circuit is configured to, in response to the potential of the pull-up node PU, pull down the potential of the second pull-down node PD2 and a potential of a second pull-down control node PD_CN2 through the low-level signal inputted from the low-level signal end VGL; and the first noise reduction sub-circuit is configured to reduce noises of signals outputted by the pull-up node PU and the signal output end OUTPUT through the low-level signal inputted by the low-level signal end VGL in response to the potential of the first pull-down node PD1. The cascade sub-circuit is configured to output the clock signal inputted from the clock signal end CLK to another cascaded shift register through a cascade signal output end OUT_C in response to the potential of the pull-up node PU.

It should be noted here that the signals outputted from the cascade signal output end OUT_C and the signal output end OUTPUT are the same, just two output ends are disposed in a shift register unit, one is the signal output end OUTPUT connected with the gate line, and the other is the cascade signal output end OUT_C for cascade. The cascade sub-circuit is set separately so as to reduce a load of the signal output end OUTPUT, to avoid affecting a scanning signal outputted from the signal output end OUTPUT.

Specifically, as shown in FIG. 2, the first pull-down control sub-circuit and the second pull-down control sub-circuit both include a fifth transistor and a ninth transistor; wherein fifth transistors in the first pull-down control sub-circuit and the second pull-down control sub-circuit are represented by M5 and M5' respectively, and ninth transistors are represented by M9 and M9' respectively. The first pull-down sub-circuit and the second pull-down sub-circuit both include a sixth transistor and an eighth transistor; wherein sixth transistors in the first pull-down sub-circuit and the second pull-down sub-circuit are represented by M6 and M6' respectively, and eighth transistors are represented by M8 and M8' respectively. The first noise reduction sub-circuit and the second noise reduction sub-circuit both include a tenth transistor, an eleventh transistor, and a twelfth transistor; wherein tenth transistors in the first noise reduction sub-circuit and the second noise reduction sub-circuit are represented by M10 and M10' respectively, and eleventh transistors are represented by M11 and M11' respectively; and the discharging sub-circuit includes a seventh transistor M7. The first auxiliary sub-circuit and the second auxiliary sub-circuit both include a sixteenth transistor, represented by M16 and M16' respectively.

Among them, a gate and a source of the fifth transistor M5 are both connected to the first power supply voltage end VDDO, and a drain of the fifth transistor M5 is connected to the first pull-down control node PD_CN1; a gate of the ninth transistor M9 is connected to the first pull-down control node PD_CN1, a source of the ninth transistor M9 is connected to the first power supply voltage end VDDO, and a drain of the ninth transistor M9 is connected to the first pull-down node PD1; a gate and a source of the fifth transistor M5' are both connected to the second power supply voltage end VDDE, and a drain of the fifth transistor M5' is connected to the second pull-down control node PD_CN2; a gate of the ninth transistor M9' is connected to the second pull-down control node PD_CN2, a source of the ninth transistor M9' is connected to the second power supply voltage end, and a drain of the ninth transistor M9' is connected to the first pull-down node PD1; a gate of the sixth transistor M6 is connected to the pull-up node PU, a source of the sixth transistor M6 is connected to the first pull-down node PD1, and a drain of the sixth transistor M6 is connected to the low-level signal end; a gate of the eighth transistor M8 is connected to the pull-up node PU, a source of the eighth transistor is connected to the first pull-down control node PD_CN1, and a drain of the eighth transistor is connected to the low-level signal end VGL; a gate of the sixth transistor M6' is connected to the pull-up node PU, a source of the sixth transistor M6' is connected to the second pull-down node PD2, and a drain of the sixth transistor M6' is connected to the low-level signal end VGL; a gate of the eighth transistor M8' is connected to the pull-up node PU, a source of the eighth transistor M8' is connected to the second pull-down control node PD_CN2, and a drain of the eighth transistor M8' is connected to the low-level signal end; a gate of the tenth transistor M10 is connected to the first pull-down node PD1, a source of the tenth transistor M10 is connected to the pull-up node PU, and a drain of the tenth transistor M10 is connected to the low-level signal end VGL; a gate of the eleventh transistor M11 is connected to the first pull-down node PD1, a source of the eleventh transistor M11 is connected to a signal output end OUTPUT, and a drain of the eleventh transistor M11 is connected to the low-level signal end VGL; a gate of the tenth transistor M10' is connected to the second pull-down node PD2, a source of the tenth transistor M10' is connected to the pull-up node PU, and a drain of the tenth transistor M10' is connected to the low-level signal end VGL; a gate of the eleventh transistor M11' is connected to the second pull-down node PD2, a source of the eleventh transistor M11' is connected to the signal output end OUTPUT, and a drain of the eleventh transistor M11' is connected to the low-level signal end; a gate of the seventh transistor M7 is connected to a frame opening signal end STV, a source of the seventh transistor M7 is connected to the pull-up node PU, and a drain of the seventh transistor M7 is connected to the low-level signal end VGL; a gate of a thirteenth transistor M13 is connected to the pull-up node PU, a source of the thirteenth transistor M13 is connected to the clock signal end CLK, and a drain of the thirteenth transistor M13 is connected to the cascade signal output end OUT_C. A gate of the sixteenth transistor M16 is connected to the signal input end INPUT, a source of the sixteenth transistor M16 is connected to the first pull-down node PD1, and a drain of the sixteenth transistor M16 is connected to the low-level signal end. A gate of the sixteenth transistor M16' is connected to the signal input end INPUT, a source of the sixteenth transistor M16' is connected to the second pull-down node PD2, and a drain of the sixteenth transistor M16' is connected to the low-level signal end VGL.

Among them, the fifth transistor M5 and the ninth transistor M9 constitute a first pull-down control sub-circuit and the fifth transistor M5' and the ninth transistor M9' constitute a second pull-down control sub-circuit to work in time-sharing mode (i.e. to work in turn). Accordingly, since a first noise reduction sub-circuit composed of the tenth transistor M10 and the eleventh transistor M11 and a second noise reduction sub-circuit composed of the tenth transistor M10' and the eleventh transistor M11' are controlled by the first pull-down control sub-circuit and the second pull-down control sub-circuit respectively, the first noise reduction sub-circuit and the second noise reduction sub-circuit also work in time-sharing mode. And working principles of the first pull-down control sub-circuit and the second pull-down control sub-circuit are the same, and working principles of the first noise reduction sub-circuit and the second noise reduction sub-circuit are the same; therefore, a working principle of the shift register will be explained below only when the first pull-down control sub-circuit and the first noise reduction sub-circuit work. It should be noted here that in the circuit structure shown in FIG. 2, part low-level signal end VGL may also be represented by LVGL, which may provide a signal of which a potential is lower than that of the low-level signal end VGL, and may more fully pull down a potential at a corresponding point.

In a discharging stage, that is, before displaying, a high-level signal is inputted to the frame opening signal end STV, the seventh transistor M7 is turned on, and the pull-up node PU is discharged through the low-level signal inputted from the low-level signal end VGL, which prevents a residual charge of the pull-up node PU from causing abnormal display.

In an input stage, the signal input end INPUT writes a high-level signal, the first transistor M1 is turned on, the potential of the pull-up node PU is pulled up by the high-level signal, and the storage capacitor C is charged.

In an output stage, since the potential of the pull-up node PU is pulled up in the input stage, the third transistor M3 is turned on, and a high-level signal inputted from the clock signal end CLK is outputted to the gate line connected with the shift register through the signal output end OUTPUT.

In a reset stage, the pull-up reset signal end RESET_PU inputs a high-level signal, the second transistor M2 is turned on, and the potential of the pull-up node PU is pulled down through the low-level signal inputted from the low-level signal end VGL to reset the pull-up node PU. Since the pull-up node PU is pulled down, the third transistor M3 is turned off, and both the signal output end OUTPUT and the cascade signal output end OUT_C no longer output a high-level signal. At the same time, the first pull-down control node PD_CN1 and the pull-down node are both high-level signals, the tenth transistor M10 and the eleventh transistor M11 are turned on, and noise reductions are performed on outputs of the pull-up node PU, the signal output end OUTPUT, and the cascade signal output end OUT_C respectively until the potential of the pull-up node PU is pulled up when next frame scanning starts.

As shown in FIG. 2, in order to reduce the load of the signal output end OUTPUT, signals outputted from the signal output end OUTPUT are only used for controlling gating and turning off of the gate line, and a cascade sub-circuit is also disposed in the shift register; in response to the potential of the pull-up node PU, the cascade sub-circuit outputs the clock signal inputted from the clock signal end CLK to another cascaded shift register through the cascade signal output end OUT_C. The cascade signal output end OUT_C outputs the same signal as the signal output end OUTPUT, i.e. outputs a high-level signal to a pull-up reset signal end RESET_PU of another cascaded shift register and a signal input end INPUT of another cascaded shift register. Among them, the cascade sub-circuit includes a thirteenth transistor M13, wherein a gate of the thirteenth transistor M13 is connected to the pull-up node PU, a source of the thirteenth transistor M13 is connected to the clock signal end CLK, and a drain of the thirteenth transistor M13 is connected to the cascade signal output end OUT_C. At the same time, twelfth transistors, represented by M12 and M12' respectively, are disposed in both the first noise reduction sub-circuit and the second noise reduction sub-circuit for performing a noise reduction on the signal outputted from the cascade signal output end OUT_C. A gate of the twelfth transistor M12 is connected to the first pull-down node PD1, a source of the twelfth transistor M12 is connected to the cascade signal output end OUT_C, and a drain of the twelfth transistor M12 is connected to a low-level signal end; a gate of the twelfth transistor M12' is connected to the second pull-down node PD2, a source of the twelfth transistor M12' is connected to the cascade signal output end OUT_C, and a drain of the twelfth transistor M12' is connected to the low-level signal end VGL.

Figure 3:
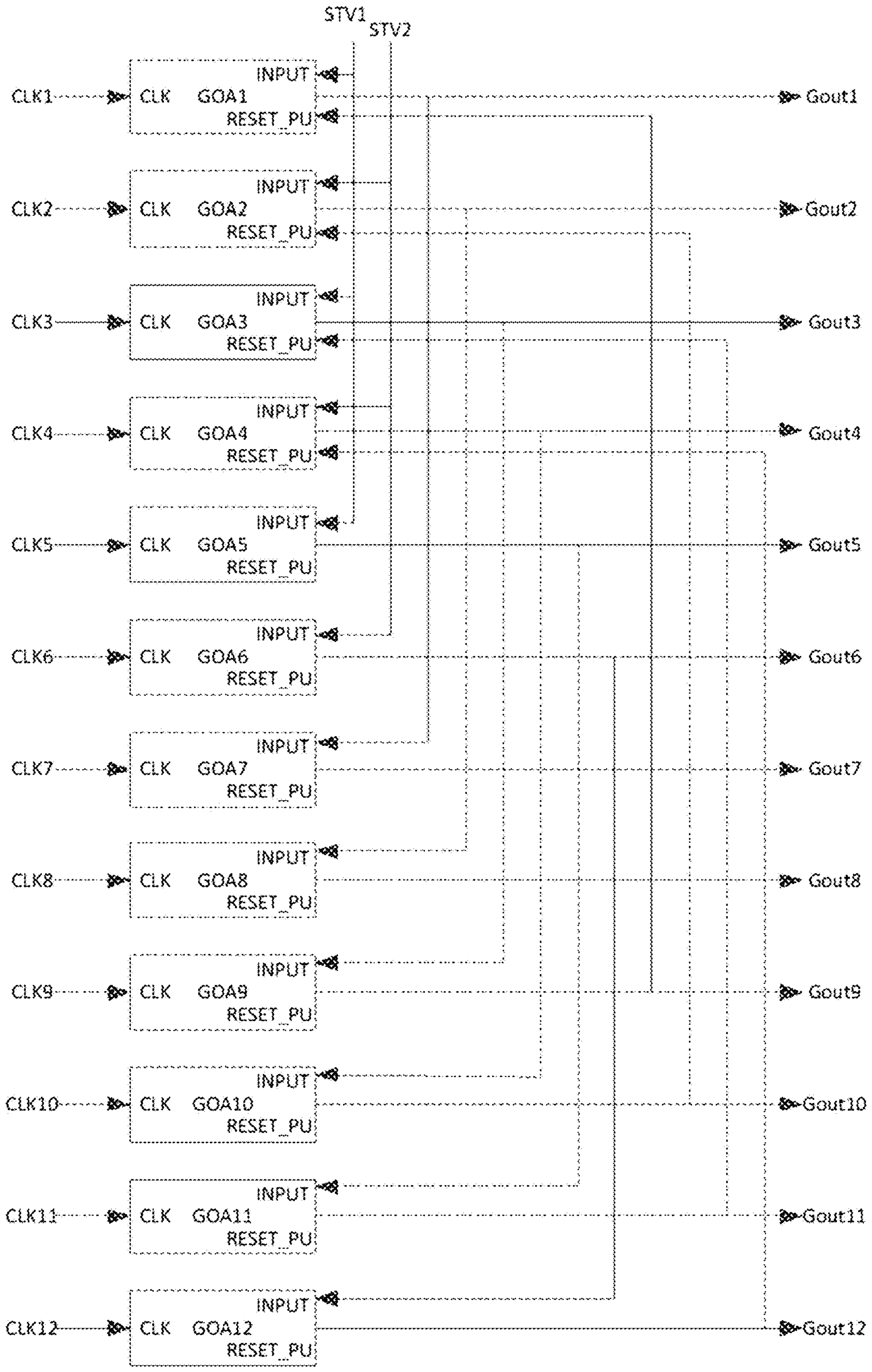
FIG. 3 is a schematic diagram of a structure of a starting part row in a gate driving circuit according to an embodiment of the present disclosure.

FIG. 3 is a schematic diagram of a structure of a starting part row in a gate driving circuit according to an embodiment of the present disclosure. As shown in FIG. 3, the gate driving circuit includes N shift registers and P clock signal lines; every adjacent P shift registers of the N shift registers are connected to the P clock signal lines respectively; signal output ends of the N shift registers are connected one-to-one with N gate lines respectively; wherein P is an even number greater than or equal to 6; N is an integer greater than or equal to P; and M is a positive integer.

In an embodiment of the present disclosure, a description is made by taking the quantity of clock signal lines being specifically 12 as an example, and a duty cycle of a clock signal inputted in each clock signal line may be 1/12 to 1/2, i.e. a high-level maintenance time of the clock signal is 1H to 6H. In an embodiment of the present disclosure, a description is made by taking the duty cycle of the clock signal being 1/2 as an example, and for the display panel of 8K/120 Hz, 1H time is 1.85 microseconds (μs). It can be understood that the quantity of clock signal lines in the gate driving circuit in an embodiment of the present disclosure may also be 4, 6, 8, 10, 14, 16, or other quantities, and may be set according to an actual need.

In some embodiments, a signal output end of an i-th shift register is connected to a signal input end of an (i+p)-th shift register; wherein $P/2 \le p < N$; and $i \le N-p$; a pull-up reset signal end of an j-th shift register is connected to a signal output end of an (j+q)-th shift register; $2 \le q-p < N/2$; and $j \le N-q$.

In an embodiment of the present disclosure, a description is made by taking a value of p being 6 and a value of q being 8 as an example, a signal output end OUTPUT of a first shift register is connected to an input end INPUT of an seventh shift register, a signal output end OUTPUT of a second shift register is connected to an input end INPUT of an eighth shift register. Similarly, a pull-up reset signal end RESET_PU of a ninth shift register is connected to the signal output end OUTPUT of the first shift register, a pull-up reset signal end RESET_PU of a tenth shift register is connected to the signal output end OUTPUT of the second shift register; and so on, so that a whole gate driving circuit is formed by connecting. In this way, a pull-up reset signal end RESET_PU of the first shift register may be delayed for 2H to be written into a high-level signal, that is, the potential of the pull-up node PU may be delayed for 2H to be pulled down, such that an output sub-circuit of the first shift register is delayed for 2H for working, and the output sub-circuit may discharge the signal output end OUTPUT through a low-level signal written through the clock signal line, thus alleviating a trailing phenomenon of a falling edge of the signal output end OUTPUT.

It should be noted here that in an embodiment of the present disclosure, $q-p \ge 2$, at this time a potential of a pull-up node PU of each shift register may be delayed for 2H to be pulled down. Of course, the relationship between q and p also needs to satisfy $q-p < N/2$, so as to avoid a case that the potential of the pull-up node PU has not been reset when a high level is written to a next frame signal.

In some embodiments, the display panel also includes a first frame opening signal line and a second frame opening signal line; signal input ends of odd rows in the first shift register to an (N/2)-th shift register are all connected to the first frame opening signal line; and signal input ends of even rows in the first shift register to the (N/2)-th shift register are all connected to the second frame opening signal line.

A first frame opening signal line STV1 may provide a frame opening signal to signal input ends INPUT of odd rows in the first shift register to the (N/2)-th shift register, and similarly, a second frame opening signal line STV2 may provide a frame opening signal to signal input ends INPUT of even number rows in the first shift register to the (N/2)-th shift register, so that the gate driving circuit works normally. It should be noted here that the first frame opening signal line STV1 and the second frame opening signal line STV2 have the same function, and they may work in time-sharing mode (i.e., work in turn) to reduce a load of one of them, so as to avoid affecting a frame opening signal outputted from the signal input end INPUT. On the other hand, the first frame opening signal line STV1 and the second frame opening signal line STV2 may also input a high-level signal to a frame opening signal end STV in the gate driving circuit before displaying, so that a corresponding transistor is turned on, and the pull-up node PU is discharged through a low-level signal, which prevents a residual charge of the pull-up node PU from causing abnormal display.

Figure 4:
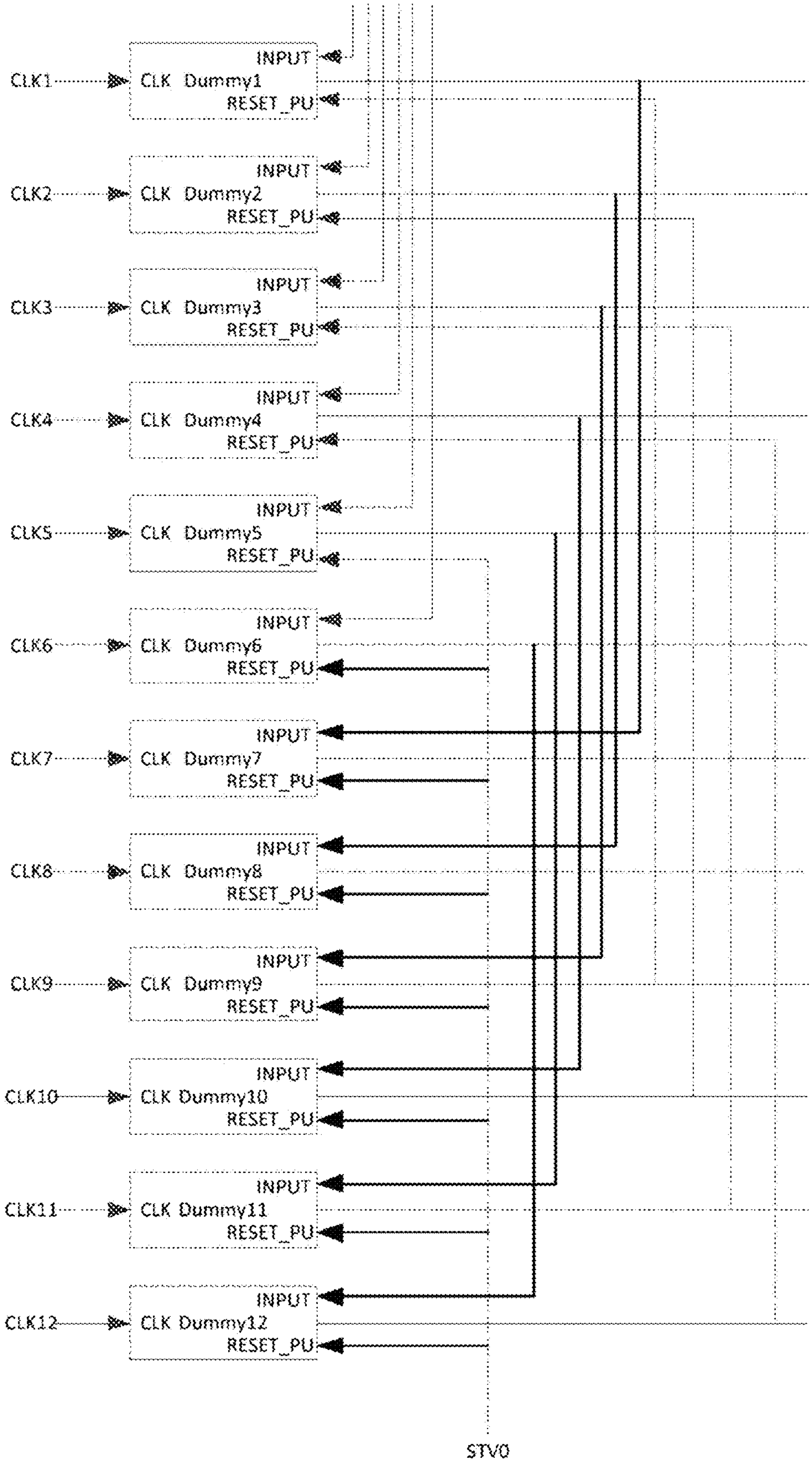
FIG. 4 is a schematic diagram of a structure of multiple redundant shift registers in a gate driving circuit according to an embodiment of the present disclosure.

In order to ensure normal working of last multiple shift registers in the display panel, multiple redundant shift registers also need to be disposed in the display panel in an embodiment of the present disclosure. In an embodiment of the present disclosure, a function of the redundant registers is only to provide cascade signals for the last multiple shift registers, and output signals thereof are not connected to the gate lines of the display panel. FIG. 4 is a schematic diagram of a structure of multiple redundant shift registers in a gate driving circuit according to an embodiment of the present disclosure. As shown in FIG. 4, in an embodiment of the present disclosure, a description is made by taking 12 redundant shift registers as an example. Clock signal ends CLK of the 12 redundant shift registers are connected to 12 clock signals respectively, and pull-up reset signal ends RESET_PU of the 12 redundant shift registers are all connected to a third frame opening signal line STV0. Signal output ends OUTPUT of a first redundant shift register to a sixth redundant shift register are connected to pull-up reset signal ends RESET_PU of an (N−5)-th shift register to an N-th shift register respectively, and signal output ends OUTPUT of a seventh redundant shift register to a twelfth redundant shift register are connected to pull-up reset signal ends RESET_PU of the first redundant shift register to the sixth redundant shift register respectively. The third frame opening signal line may reset potentials of pull-up nodes PU of 12 redundant shift registers, and cascaded output signals outputted from the signal output ends OUTPUT of the first redundant shift register to the sixth redundant shift register may reset pull-up nodes PU of last six shift registers in the N shift registers, and at the same time, cascaded output signals outputted from the signal output ends OUTPUT of the seventh redundant shift register to the twelfth redundant shift register may reset pull-up nodes PU of the first redundant shift register to the sixth redundant shift register to ensure a normal operation of the gate driving circuit.

Figure 14:
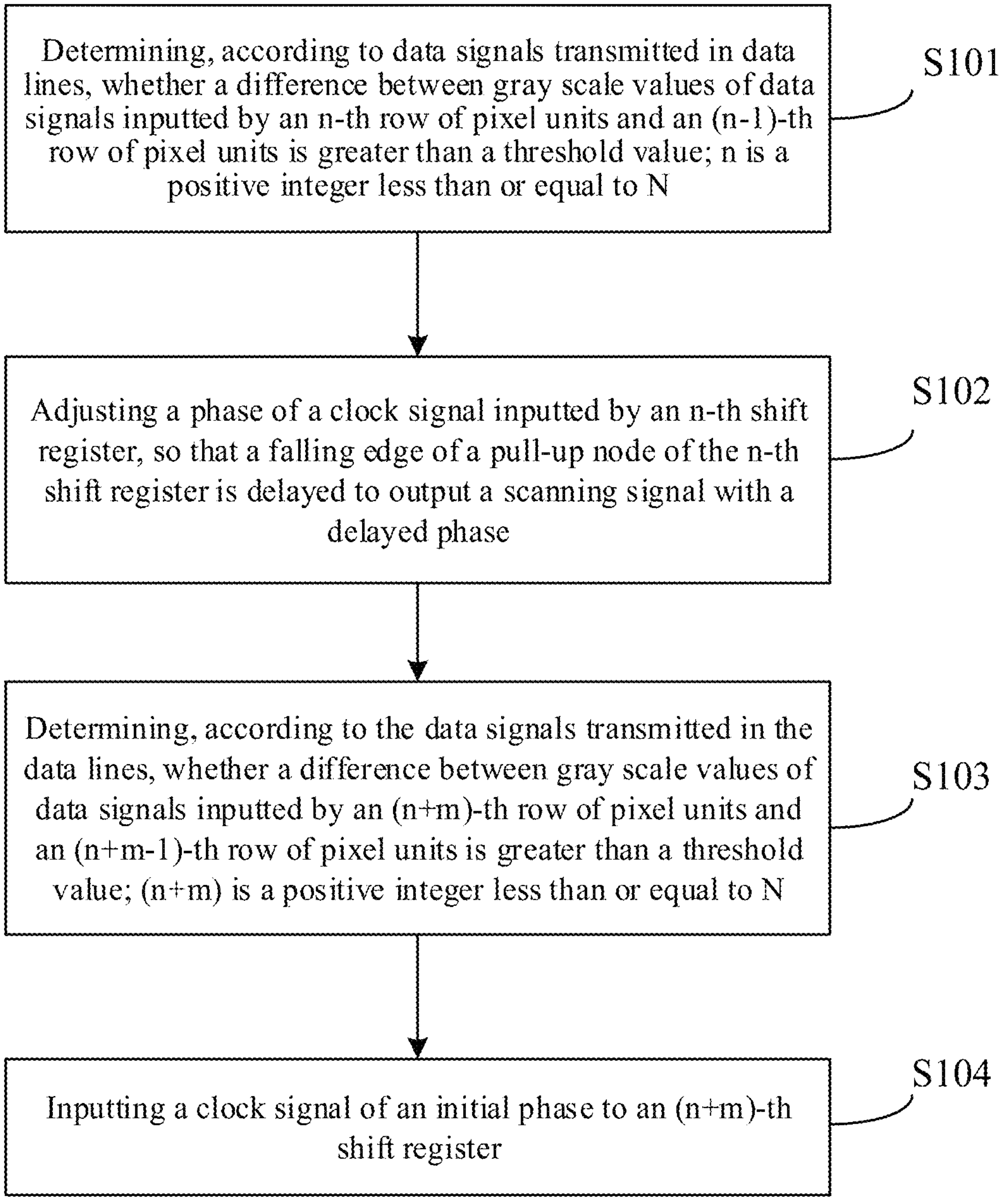
FIG. 14 is a block diagram of a method for driving a display panel according to an embodiment of the present disclosure.

As shown in FIG. 14, an embodiment of the present disclosure also provides a method for driving a display panel, including the following acts S101 to S102.

In the act S101, it is determined, according to data signals transmitted in data lines, whether a difference between gray scale values of data signals inputted by an n-th row of pixel units and an (n−1)-th row of pixel units is greater than a threshold value; n is a positive integer less than or equal to N.

If the difference between the gray scale values of the data signals inputted by the n-th row of pixel units and the (n−1)-th row of pixel units is greater than the threshold value, the act S102 is performed. In the act S102, a phase of a clock signal inputted by an n-th shift register is adjusted, so that a falling edge of a pull-up node of the n-th shift register is delayed to output a scanning signal with a delayed phase.

It should be noted here that a threshold value involved in an embodiment of the present disclosure is a preset value of a difference between data signals inputted by two adjacent rows. If the threshold value is relatively large, it means that data signals inputted by two adjacent rows of pixel units have sudden changes, it is displayed as that a difference of brightnesses of the two adjacent rows of pixel units is relatively large in a display picture. Specifically, the threshold value may be set to 63, 128, or 255, etc. For example, a data signal is switched from L63 to L0, from L127 to L255, or from L0 to L255, etc., which may all be considered as that the data signal is switched between high and low gray scales, and the threshold value may be reasonably set according to an actual need. In a practical application, adjusting the phase of the clock signal inputted by the n-th shift register may be implemented by extending a low-level maintenance time of the clock signal inputted by the n-th shift register by 1H to 2H, or may be implemented by extending a high-level maintenance time of the clock signal inputted by the n-th shift register by 1H to 2H. In an embodiment of the present disclosure, descriptions are made by taking extending the low-level maintenance time of the clock signal inputted by the n-th shift register by 1H and extending the high-level maintenance time of the clock signal inputted by the n-th shift register by 1H as examples.

Figure 5:
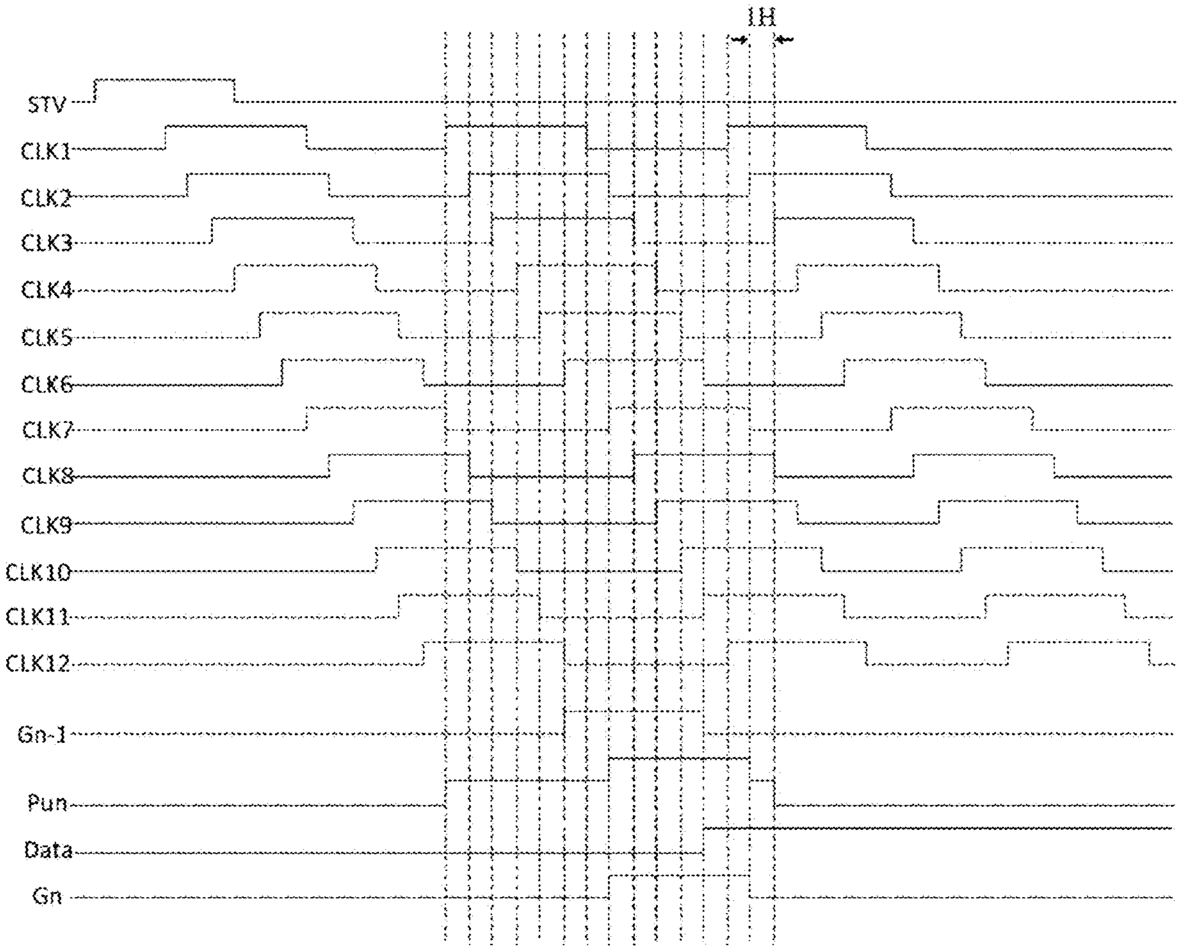
FIG. 5 is a timing diagram of signals inputted by a display panel containing 12 clock signal lines according to an embodiment of the present disclosure.

A description is made below in detail in conjunction with timing of inputted signals in the display panel. FIG. 5 is a timing diagram of inputted signals of the display panel containing 12 clock signal lines according to an embodiment of the present disclosure, as shown in FIG. 5, taking the working timing of Gn row GOA corresponding to CLK7 as an example. In an input phase, a timing controller monitors that a data signal inputted by a data signal line in a seventh row of pixel units is switched between high and low gray scales, or the sixth row and the seventh row are switched between high and low gray scales. Timing of a clock signal in a clock signal line CLK7 connected to a seventh shift register may be adjusted so that a low-level maintenance time of the clock signal in CLK7 is extended from original 6H to 7H, and the low-level maintenance time thereof is longer than a low-level maintenance time of a clock signal in CLK6 by 1H. An output signal of a signal output end OUTPUT of a first shift register is inputted to a signal input end INPUT as an input signal of a shift register of the present stage. At this time, the first transistor M1 is turned on to pre-charge the pull-up node PU. A low-level maintenance time of a clock signal inputted by the seventh shift register is equal to a pre-charging maintenance time of the pull-up node PU. A potential of the pull-up node PU is raised, so that the third transistor M3 and the thirteenth transistor M13 are turned on. Since a clock signal of shift registers of the present row is at a low level, the scanning signal outputted from the signal output end OUTPUT still remains at a low potential, and the low-level maintenance time is increased by 1H, but timing of data signals remains unchanged. When the potential of the pull-up node PU rises, the sixth transistor M6 and the eighth transistor M8 are turned on at the same time, and a potential of the pull-down node PD is pulled down.

Figure 6:
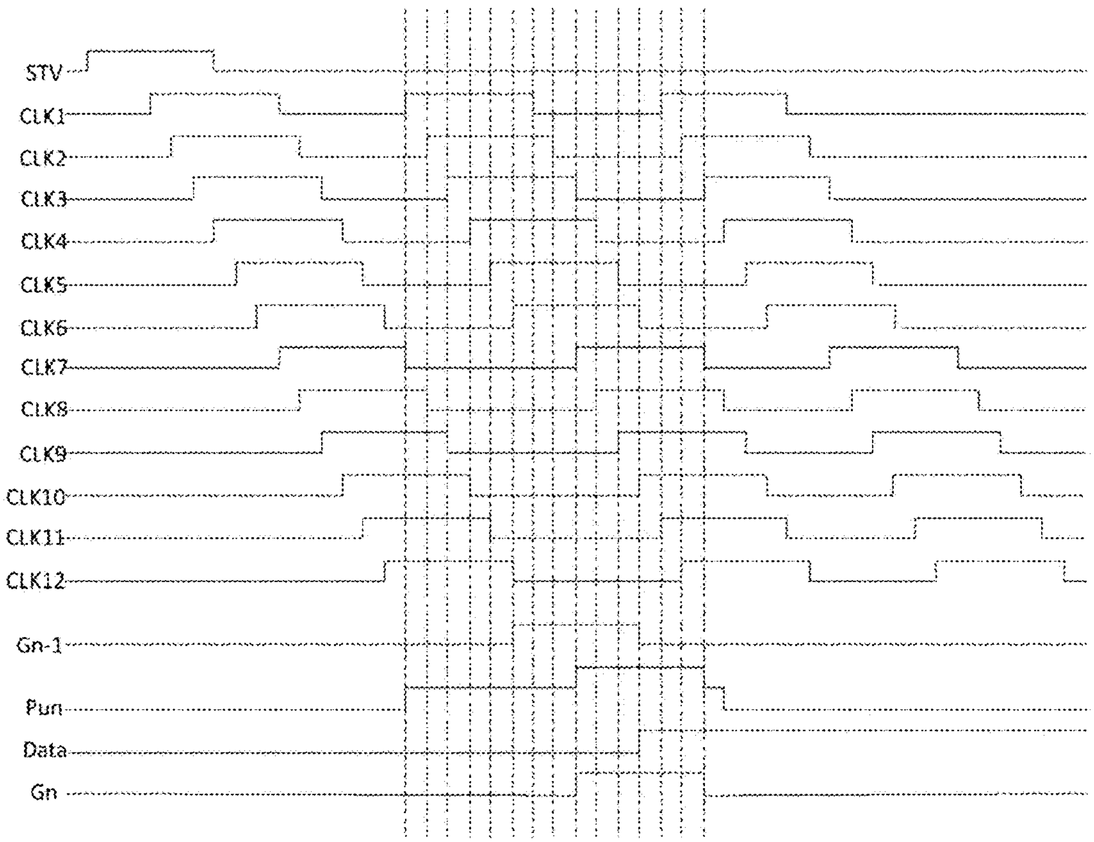
FIG. 6 is another timing diagram of signals inputted by a display panel containing 12 clock signal lines according to an embodiment of the present disclosure.

In an output stage, the third transistor M3 is turned on by a high level of the pull-up node PU, at this time the clock signal is at a high level, the potential of the signal output end OUTPUT rises, and a scanning signal is outputted, and at the same time, due to a capacitor bootstrap effect, the potential of the pull-up node PU continuously rises; the sixth transistor M6 and the eighth transistor M8 still remain turned on, the potential of the pull-down node PD remains at a low level and the low-level maintenance time is increased by 1H, a scanning signal of the seventh row is delayed by 1H with respect to the timing of the data signal, so that a pre-charging time of the seventh row of pixel units is increased by 1H, or, as shown in FIG. 6, the potential of the pull-down node PD remains at a low level and the low-level maintenance time is increased by 2H, a scanning signal for the seventh row is delayed by 2H with respect to the timing of the data signal, so that a pre-charging time of the seventh row is increased by 2H. After high-low switching of the data signal, for example, the data signal switched to L255 is overlapped with a Gn output signal in timing by 2H or more than 2H, so that the pre-charging time of that row of pixel units is longer than the pre-charging time of other rows of pixel units by 1H or more than 1H. When an actual signal is inputted, the pixel units have been at a relatively high potential, so that a charging rate of the row can be improved, which avoids poor display such as line image sticking or the like.

It should be noted here that a change of a potential of a pull-up node PUn of the n-th shift register, i.e. a pull-up node PU of the seventh shift register, may be divided into three stages. As shown in FIGS. 5 and 6, the low-level maintenance stage is a pre-charging stage of the pull-up node PU, since a high-level signal is inputted from an input signal end INPUT, the potential of the pull-up node PU is pulled up for the first time, this high-level maintenance stage is the pre-charging stage of the pull-up node PU, the potential of the pull-up node PU is pulled up for the second time due to a capacitor bootstrap function, this high-level maintenance stage is a charging stage of the pull-up node PU, the potential of the pull-up node PU is pulled down due to a capacitor storage function but still remains at a high level for a while, and this high-level maintenance stage is a discharging stage of the pull-up node. In an embodiment of the present disclosure, a time point of the falling edge of the pull-up node PU may be specifically a time point at which the charging stage of the pull-up node PU ends, where its potential starts to be pulled down, such as a time point at which a second time step ends shown in FIGS. 5 and 6, at this time, the charging of the pull-up node PU ends, and a corresponding scanning signal inputted by the seventh row of pixel units in the display panel ends.

Figure 7:
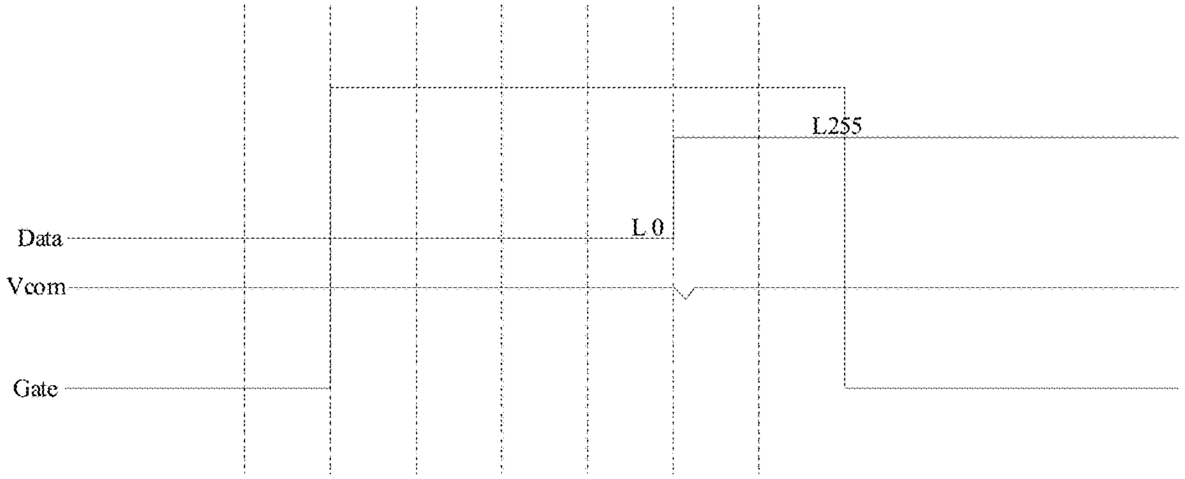
FIG. 7 is a timing diagram of a scanning signal, a data signal, and a common electrode signal of a display panel containing 12 clock signal lines according to an embodiment of the present disclosure.

On the other hand, as shown in FIG. 7, since a time point of the falling edge of the pull-up node PU in the seventh shift register is delayed by 1H, a high-level maintenance time of the corresponding scanning signal is also delayed by 1H, which is equivalent to a pulling advance of a common electrode signal caused by high-low gray scale switching of a data signal, that is, an interval between a time point of high-low switching of the data signal and an ending time point of the scanning signal is at least 1H, and the interval is relatively large, which avoids that a fluctuation of the common electrode signal affects charging of that row of pixel units, so that poor display such as crosstalk in a horizontal direction or the like can be avoided.

Figure 8:
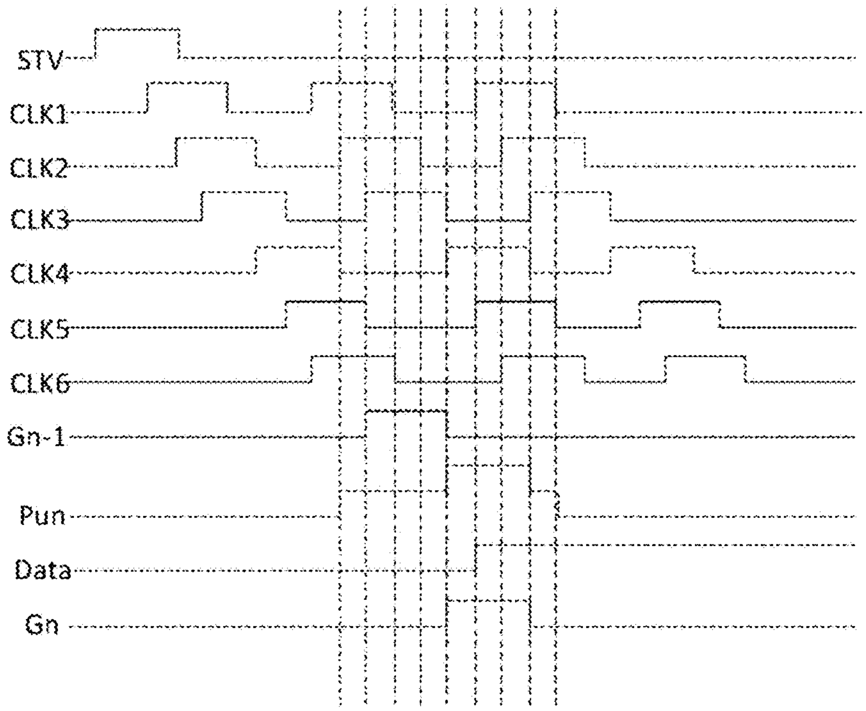
FIG. 8 is a timing diagram of signals inputted by a display panel containing 6 clock signal lines according to an embodiment of the present disclosure.

FIG. 8 is a timing diagram of a signal inputted by a display panel containing 6 clock signal lines according to an embodiment of the present disclosure. In FIG. 8, the quantity of clock signal lines of the display panel is 6. Taking that a data signal inputted by a fourth row of pixel units is switched between high and low gray scales as an example, it can be seen that timing of a scanning signal in the fourth row with respect to the data signal is delayed by 1H, so that the pre-charging time of the fourth row of pixel units is increased by 1H. After high-low switching of the data signal, for example, the data signal switched to L255 is overlapped with a Gn output signal in timing by 2H or more than 2H, so that the pre-charging time of that row of pixel units is longer than the pre-charging time of other rows of pixel units by 1H or more than 1H. When an actual signal is inputted, the pixel units have been at a relatively high potential, so that a charging rate of the row can be improved, which avoids poor display such as line image sticking or the like.

Figure 9:
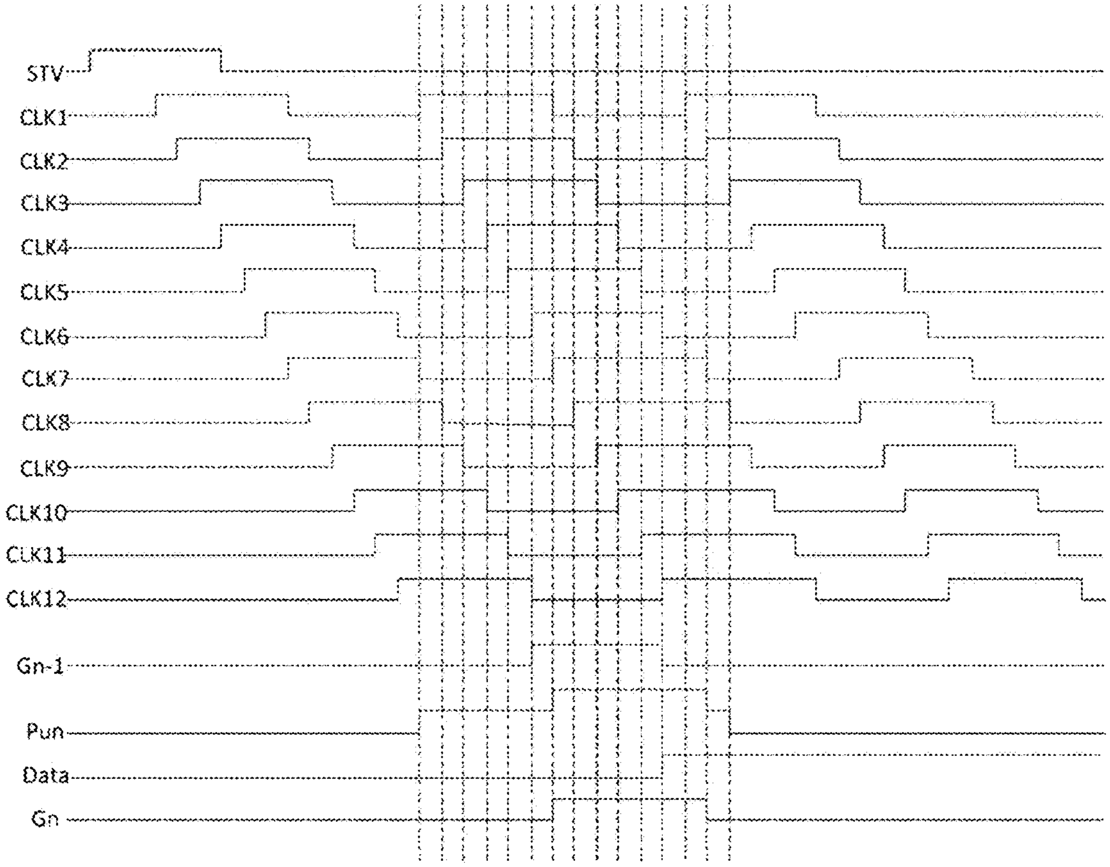
FIG. 9 is yet another timing diagram of signals inputted by a display panel containing 12 clock signal lines according to an embodiment of the present disclosure.

FIG. 9 is another timing diagram of signals inputted by the display panel containing 12 clock signal lines according to an embodiment of the present disclosure, as shown in FIG. 9, taking Gn row GOA working timing corresponding to CLK7 as an example. In an input stage, a timing controller monitors that a data signal inputted by a data signal line in a seventh row of pixel units is switched between high and low gray scales. Timing of a clock signal in a clock signal line CLK7 connected to a seventh shift register may be adjusted so that a high-level maintenance time of the clock signal in CLK7 is extended from original 6H to 7H. An output signal of a signal output end OUTPUT of a first shift register is inputted to a signal input end INPUT as an input signal of a shift register at the present stage, at this time the first transistor M1 is turned on to pre-charge the pull-up node PU, the potential of the pull-up node PU is raised. At the same time, the potential of the pull-up node PU continuously rises due to a capacitor bootstrap effect, which turns on the third transistor M3 and the thirteenth transistor M13, charging the pull-up node PU. The high-level maintenance time of the clock signal inputted by the seventh shift register is equal to the charging time of the pull-up node PU. Since the clock signal of the shift registers in the present row is at a low level, a scanning signal outputted from the signal output end OUTPUT still remains at a low potential, while the potential of the pull-up node PU rises, the sixth transistor M6 and the eighth transistor M8 are turned on, a potential of the pull-down node PD is pulled down.

Figure 10:
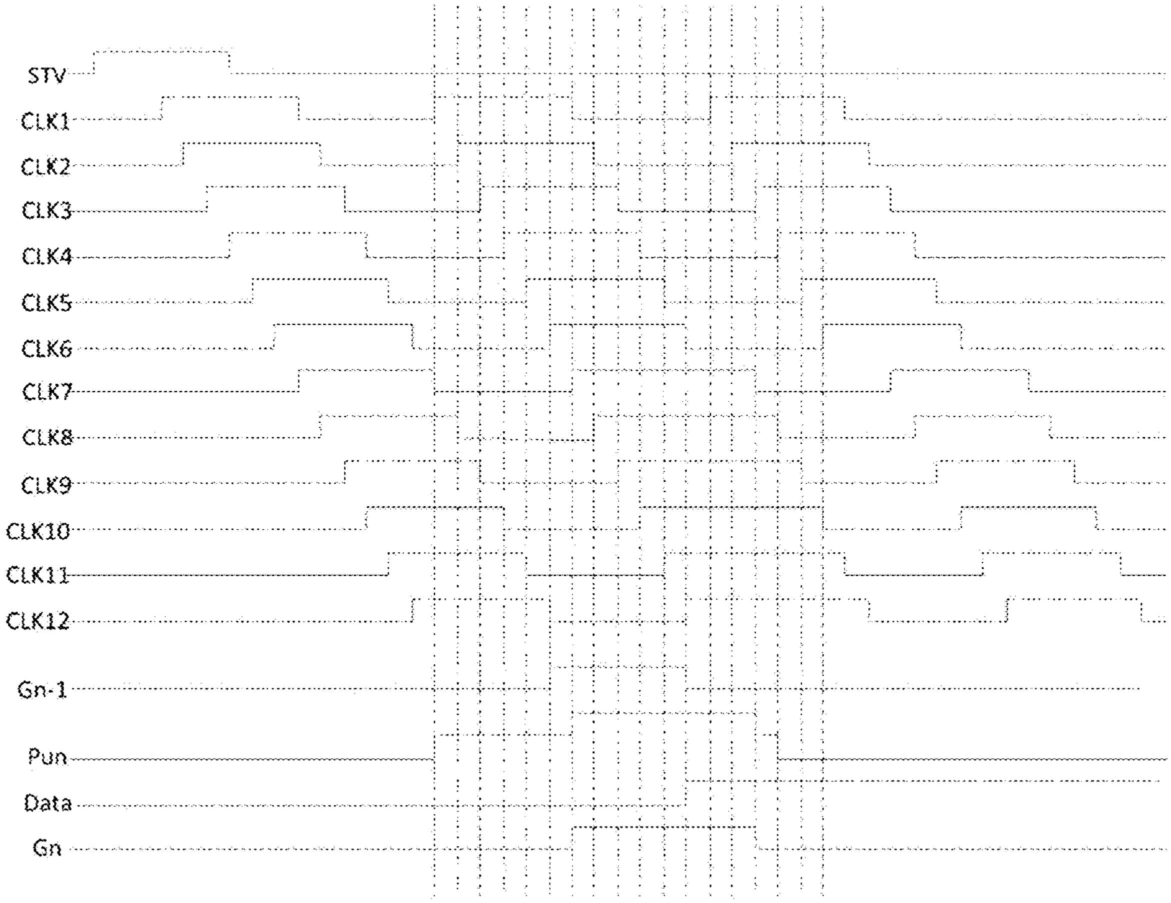
FIG. 10 is further another timing diagram of signals inputted by a display panel containing 12 clock signal lines according to an embodiment of the present disclosure.

In an output stage, the third transistor M3 is turned on by a high level of the pull-up node PU, at this time the clock signal is at a high level, a potential of the signal output end OUTPUT rises, and a scanning signal is outputted. At the same time, due to a capacitor bootstrap effect, the potential of the pull-up node PU continuously rises, at this time since a high-level maintenance time of the clock signal in CLK7 is increased by 1H, its capacitor bootstrap time is also increased by 1H. The sixth transistor M6 and the eighth transistor M8 are still kept being turned on, the potential of the pull-down node PD remains at a low level, since the capacitor bootstrap time is increased by 1H, the charging time of the pull-up node PU is increased by 1H. Accordingly, a high-level time of a scanning signal Gn of the row is increased by 1H, so that the turn-on time of a drive transistor in a pixel unit in the seventh row is increased by 1H, or as shown in FIG. 10, the capacitor bootstrap time therein is increased by 2H, so that the charging time of the pull-up node PU is increased by 2H, and accordingly, the high-level time of the scanning signal Gn of the row is increased by 2H. After high-low switching of the data signal, for example, the data signal switched to L255 is overlapped with a Gn output signal in timing by 2H or more than 2H, so that the pre-charging time of that row of pixel units is longer than the pre-charging time of other rows of pixel units by 1H or more than 1H, thus a charging rate of the row can be improved, which avoids poor display such as line image sticking or the like.

Figure 11:
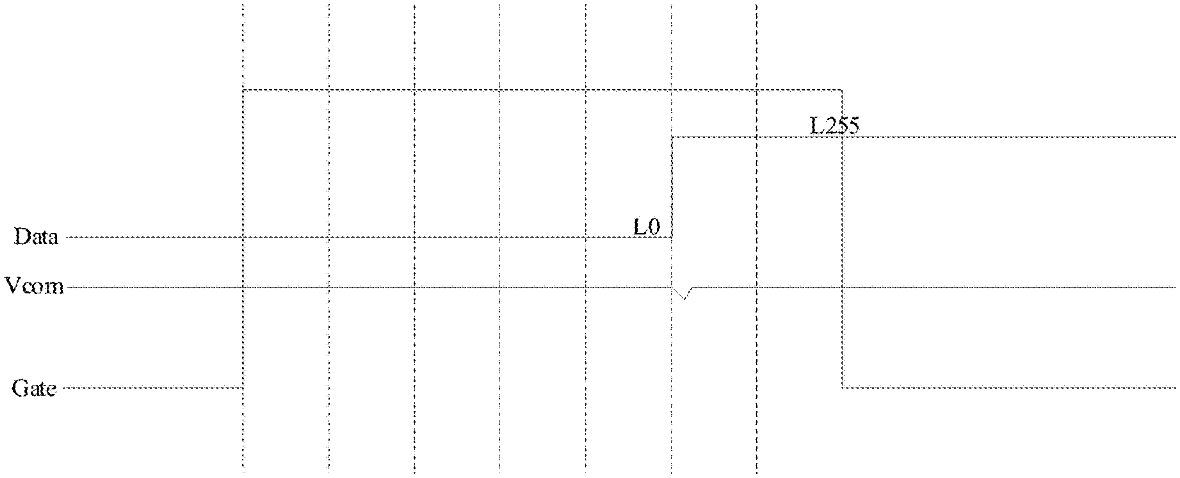
FIG. 11 is another timing diagram of a scanning signal, a data signal, and a common electrode signal of a display panel containing 12 clock signal lines according to an embodiment of the present disclosure.

On the other hand, as shown in FIG. 11, since a time point of the falling edge of the pull-up node PU in the seventh shift register is delayed by 2H, a high-level maintenance time of the corresponding scanning signal is also delayed by 2H, which is equivalent to a pulling advance of a common electrode signal caused by high-low gray scale switching of a data signal, that is, an interval between a time point of high-low switching of the data signal and an ending time point of the scanning signal is at least 2H, and the interval is relatively large, which avoids that a fluctuation of the common electrode signal affects charging of the row of pixel units, so that poor display such as crosstalk in a horizontal direction or the like can be avoided.

Figure 12:
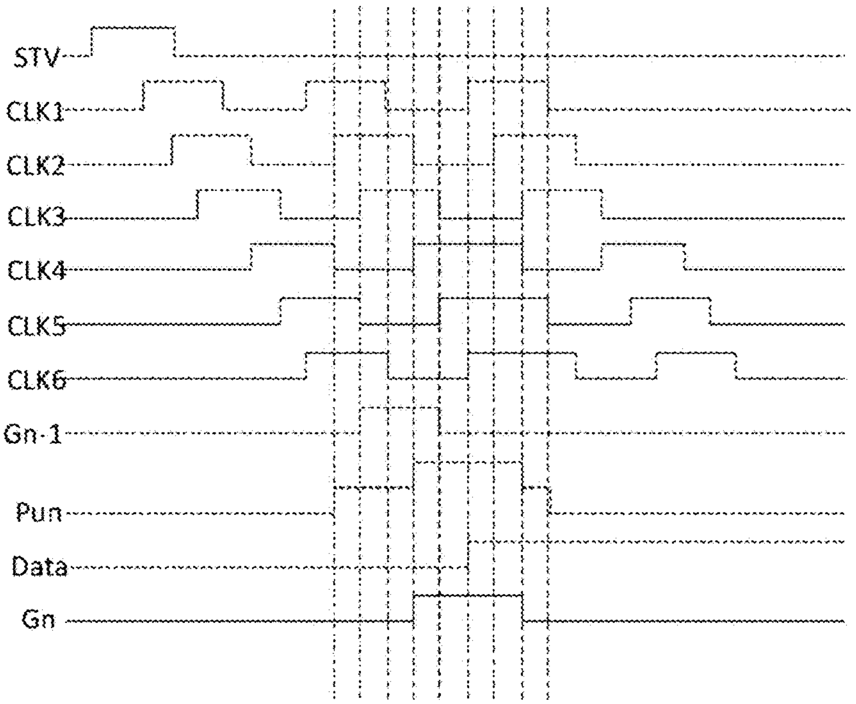
FIG. 12 is another timing diagram of signals inputted by a display panel containing 6 clock signal lines according to an embodiment of the present disclosure.

FIG. 12 is another timing diagram of a signal inputted by a display panel containing 6 clock signal lines according to an embodiment of the present disclosure. In FIG. 12, the quantity of clock signal lines of the display panel is 6. Taking that a data signal inputted by a fourth row of pixel units is switched between high and low gray scales as an example, it can be seen that since the capacitor bootstrap time is increased by 1H, the charging time of the pull-up node PU is increased by 1H, and correspondingly, a high-level time of a scanning signal Gn in the fourth row is increased by 1H, so that the turn-on time of a driving transistor in the fourth row of pixel units is increased by 1H. After high-low switching of the data signal, for example, the data signal switched to L255 is overlapped with a Gn output signal in timing by 2H or more than 2H, so that the pre-charging time of that row of pixel units is longer than the pre-charging time of other rows of pixel units by 1H or more than 1H, so that a charging rate of the row can be improved, which avoids poor display such as line image sticking or the like.

As shown in FIG. 14, in some embodiments, the method for driving a display panel also includes the following acts S103 to S104.

In the act S103, it is determined, according to the data signals transmitted in the data lines, whether a difference between gray scale values of data signals inputted by an (n+m)-th row of pixel units and an (n+m−1)-th row of pixel units is greater than a threshold value; (n+m) is a positive integer less than or equal to N.

If the difference between the gray scale values of the data signals inputted by an (n+m)-th row of pixel units and an (n+m−1)-th row of pixel units is less than or equal to the threshold value, the act S104 is performed. In the act S104, a clock signal of an initial phase is inputted to an (n+m)-th shift register.

After the high-low gray scale switching, it may continue to detect whether data signals inputted by adjacent rows of pixel units are switched between high and low gray scales, if high-low switching of the data signal does not occur, a corresponding clock signal line may be inputted with the clock signal of the initial phase, then a timing adjustment is performed until the next high-low switching of the data signal is detected, so as to avoid that the clock signal is disordered, wrong charging is caused, and a display effect of a display picture is affected. In addition, optionally, taking the shift registers with 12 clock signals as a group as an example, if it is detected that a sixth row of signals and a seventh row of signals are switched between high and low gray scales, the timing of a clock signal in a seventh row may be adjusted, and then the timing of first six rows of clock signals keeps consistent at this time, which means that the high-level time and the low-level time of the clock signal are consistent (high level for 6H and low level for 6H for all), and then clock signals are all in the timing after a timing adjustment from the seventh row to a twelfth row, and then, when scanning is started from a first row again, the first row to the twelfth row are all restored to the timing without a timing adjustment before the high and low switching (high level for 6H and low level for 6H for all). Of course, it may also be the case that, for example, it is detected that the sixth row and the seventh row are switched between high and low gray scales, and timing of the clock signal in the seventh row may be adjusted. After that, if it is detected subsequently that no high and low gray scales switching occurs in adjacent rows, for example, when a ninth row is scanned, the clock signal of the seventh row may be restored to the initial timing (high level for 6H and low level for 6H), and a specific recovery time may be set according to an actual need, which is not limited here. It can be seen that when a data signal in a data line in the display panel is switched between high and low gray scales, a phase of a clock signal inputted by a shift register corresponding to that row of pixel units is adjusted, so that a time point of a falling edge of a pull-up node of the corresponding shift register is delayed to output a scanning signal with a delayed phase, and its subsequent clock signal is also adjusted in the same way, and its preceding clock signal is not adjusted. If it is detected subsequently that no high and low gray scales switching occurs in adjacent rows, data signals in all data signal lines are restored to the initial phase, so as to avoid that the clock signal is disordered, causing an output of the scanning signal being disordered, causing wrong charging, and affecting a display effect.

Figure 13:
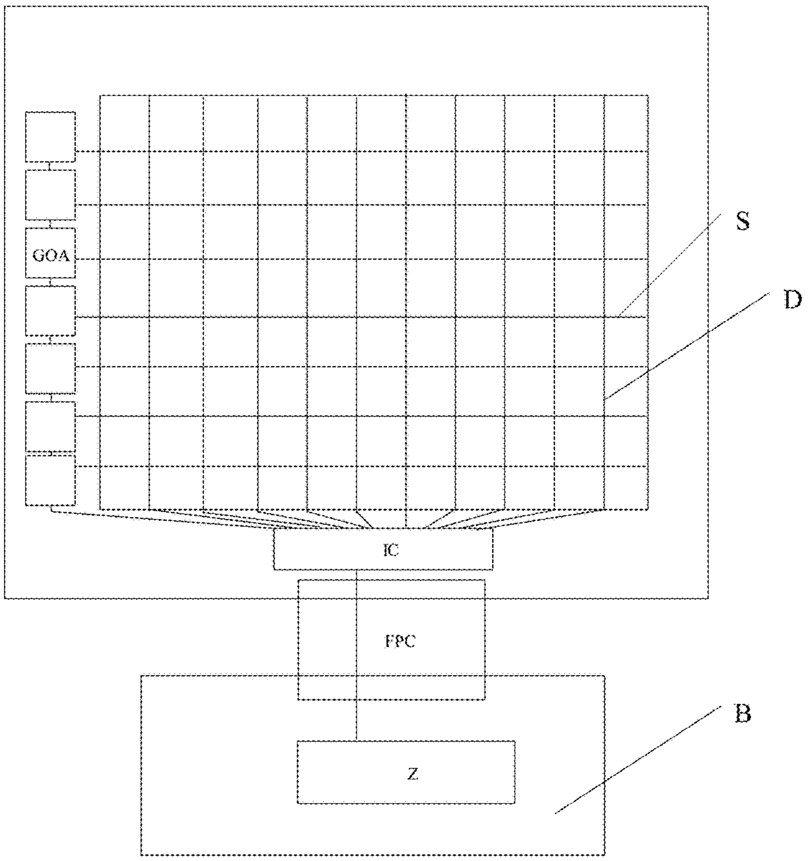
FIG. 13 is a schematic diagram of a structure of a display panel according to an embodiment of the present disclosure.

An embodiment of the present disclosure also provides a display panel. FIG. 13 is a schematic diagram of a structure of a display panel according to an embodiment of the present disclosure. As shown in FIG. 13, the display panel includes: N gate lines S and M data lines D intersected, and pixel units located in regions limited by the gate lines and the data lines; the display panel also includes N shift registers GOA and P clock signal lines; every adjacent P shift registers in the N shift registers are connected to P clock signal lines respectively; signal output ends of the N shift registers are connected one-to-one with the N gate lines respectively; wherein P is an even number greater than or equal to 2; N is an integer greater than or equal to P; M is a positive integer; the display panel also includes a detection module Z, configured to perform the acts S101 to S104 in the method for driving the display panel provided by any of the above embodiments, an implementation principle of which is the same as that of the above method for driving the display panel, and is not repeated here. The detection module Z may be a timing controller T-CON, the detection module Z may be disposed on a main board of the display panel, and electrically connected with the display panel through the main board, and the detection module may also be disposed on a separate main board B of the timing controller, and electrically connected with the display panel, wherein the connection with the display panel may be a direct connection or a connection through a flexible printed circuit board FPC, which is not limited here. The display panel also includes a driving chip IC, which may be disposed on the display panel, as shown in FIG. 13, or on the FPC. In addition, signals of the timing controller may be electrically connected to the driving chip IC through a lead or other ways to achieve an electrical connection with the display panel.

An embodiment of the present disclosure also provides a display apparatus, including a display panel provided by any of the above embodiments, wherein the display apparatus may be any product or component with a display function such as a television, a mobile phone, a display, a notebook computer, a digital photo frame, or a navigator, etc. Its implementation principle is similar to that of the display panel described above, and will not be repeated here.

It can be understood that the above implementations are only exemplary implementations employed for the purpose of illustrating the principles of the present disclosure. However, the present disclosure is not limited thereto. To those of ordinary skill in the field, various modifications and modifications may be made without departing from the spirit and the substance of the present disclosure, and these modifications and modifications are also regarded as within the protection scope of the present disclosure.

The invention claimed is:

1. A method for driving a display panel, wherein the display panel comprises: N gate lines and M data lines intersected, and pixel units located within regions limited by the gate lines and the data lines; the display panel also comprises N shift registers and P clock signal lines; every adjacent P shift registers in the N shift registers are connected to the P clock signal lines respectively; signal output ends of the N shift registers are connected one-to-one with the N gate lines respectively; wherein P is an even number greater than or equal to 2; N is an integer greater than or equal to P; M is a positive integer; wherein the method for driving the display panel comprises:

determining, according to data signals transmitted in the data lines, whether a difference between gray scale values of data signals inputted by an n-th row of pixel units and an (n−1)-th row of pixel units is greater than a threshold value; where n is a positive integer less than or equal to N;

whenever the difference between the gray scale values of the data signals inputted by the n-th row of pixel units and the (n−1)-th row of pixel units is greater than the threshold value, adjusting a phase of a clock signal inputted by an n-th shift register, to cause a falling edge of a pull-up node of the n-th shift register to be delayed in time to output a scanning signal with a delayed phase.

2. The method for driving the display panel of claim 1, wherein whenever the difference between the gray scale values of the data signals inputted by the n-th row of pixel units and the (n−1)-th row of pixel units is greater than the threshold value, an interval between a time point of a data signal inputted by the n-th row of pixel units and a time point of a falling edge of the pull-up node of the n-th shift register is greater than 1H; wherein 1H is a charging time of a row of pixel units, and whenever the difference between the gray scale values of the data signals inputted by the n-th row of pixel units and the (n−1)-th row of pixel units is not greater than the threshold value, a corresponding clock signal line is inputted with a clock signal of an initial phase, then a timing adjustment is performed until the difference between the gray scale values of next data signals inputted by the n-th row of pixel units and the (n−1)-th row of pixel units is greater than the threshold value.

3. A display apparatus, comprising the display panel according to claim 2.

4. The method for driving the display panel of claim 1, wherein adjusting the phase of the clock signal inputted by the n-th shift register comprises:

extending a non-working level maintenance time of the clock signal inputted by the n-th shift register.

5. The method for driving the display panel of claim 4, wherein the non-working level maintenance time of the clock signal inputted by the n-th shift register is longer than a non-working level maintenance time of a preset clock signal by 1H to 2H.

6. A display apparatus, comprising the display panel according to claim 5.

7. The method for driving the display panel of claim 4, wherein the non-working level maintenance time of the clock signal inputted by the n-th shift register is equal to a pre-charging maintenance time of the pull-up node.

8. A display apparatus, comprising the display panel according to claim 7.

9. A display apparatus, comprising the display panel according to claim 4.

10. The method for driving the display panel of claim 1, wherein adjusting the phase of the clock signal inputted by the n-th shift register comprises:

extending a working level maintenance time of the clock signal inputted by the n-th shift register.

11. The method for driving the display panel of claim 10, wherein the working level maintenance time of the clock signal inputted by the n-th shift register is longer than a working level maintenance time of a preset clock signal by 1H to 2H.

12. The method for driving the display panel of claim 10, wherein the working level maintenance time of the clock signal inputted by the n-th shift register is equal to a charging time of the pull-up node.

13. A display apparatus, comprising the display panel according to claim 10.

14. The method for driving the display panel of claim 1, wherein a time of a data signal inputted by the n-th row of pixel units is overlapped with a charging time of the pull-up node, and an overlapping time is greater than or equal to 2H.

15. The method for driving the display panel of claim 1, also comprising:

determining, according to data signals transmitted in the data lines, whether a difference between gray scale values of data signals inputted by an (n+m)-th row of pixel units and an (n+m−1)-th row of pixel units is greater than a threshold value; where (n+m) is a positive integer less than or equal to N, wherein N is an integer greater than 2, and m is an integer greater than or equal to 1;

whenever the difference between the gray scale values of the data signals inputted by the (n+m)-th row of pixel units and the (n+m−1)-th row of pixel units is less than or equal to the threshold value, inputting a clock signal of an initial phase to an (n+m)-th shift register.

16. A display apparatus, comprising the display panel according to claim 1.

17. A display panel, comprising: N gate lines and M data lines intersected, and pixel units located within regions limited by the gate lines and the data lines; wherein the display panel also comprises N shift registers and P clock signal lines; every adjacent P shift registers in the N shift registers are connected to the P clock signal lines respectively; signal output ends of the N shift registers are connected one-to-one with the N gate lines respectively; wherein P is an even number greater than or equal to 2; N is an integer greater than or equal to P; M is a positive integer; the display panel also comprises a detector, wherein the detector is configured to detect whether a difference between gray scale values of data signals inputted by an n-th row of pixel units and an (n−1)-th row of pixel units is greater than a threshold value, whenever the difference between the gray scale values of the data signals inputted by the n-th row of pixel units and the (n−1)-th row of pixel units is greater than the threshold value, adjust a phase of a clock signal inputted by an n-th shift register, to cause a falling edge of a pull-up node of the n-th shift register to be delayed to output a scanning signal with a delayed phase, wherein n is an positive integer less than or equal to N.

18. The display panel of claim 17, wherein each of the N shift registers comprises: an input sub-circuit, an output sub-circuit, and a pull-up reset sub-circuit; wherein, the input sub-circuit is configured to, in response to an input signal from a signal input end, write the input signal to a pull-up node;

the output sub-circuit is configured to, in response to a potential of the pull-up node, output a clock signal inputted from a clock signal end through a signal output end;

the pull-up reset sub-circuit is configured to, in response to a pull-up reset signal inputted from a pull-up reset signal end, reset the potential of the pull-up node by a non-working level signal, wherein the detector is further configured to whenever the difference between the gray scale values of the data signals inputted by the n-th row of pixel units and the (n−1)-th row of pixel units is not greater than the threshold value, input a clock signal of an initial phase to a corresponding clock signal line, then perform a timing adjustment until the difference between the gray scale values of next data signals inputted by the n-th row of pixel units and the (n−1)-th row of pixel units is greater than the threshold value.

19. The display panel of claim 18, wherein a signal output end of an i-th shift register is connected to a signal input end of an (i+p)-th shift register; wherein, p is an integer and $P/2 \le p < N$; and $i \le N-p$, wherein N is an odd number greater than or equal to 4, and; and a pull-up reset signal end of an j-th shift register is connected to a signal output end of an (j+q)-th shift register; $2 \le q-p < N/2$; and $j \le N-q$, wherein q is an integer greater than or equal to 3.

20. The display panel of claim 18, also comprising: a first frame opening signal line and a second frame opening signal line; wherein, signal input ends of odd rows in a first shift register to an (N/2)-th shift register are all connected to the first frame opening signal line; and signal input ends of even rows in the first shift register to the (N/2)-th shift register are all connected to the second frame opening signal line.

* * * * *